United States Patent
Lin

(10) Patent No.: US 7,269,334 B2
(45) Date of Patent: Sep. 11, 2007

(54) RECORDING AND PLAYING BACK MULTIPLE PROGRAMS

(75) Inventor: Shu Lin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 839 days.

(21) Appl. No.: 09/916,919

(22) Filed: Jul. 27, 2001

(65) Prior Publication Data

US 2003/0021589 A1    Jan. 30, 2003

(51) Int. Cl.
*H04N 5/91* (2006.01)
(52) U.S. Cl. .......................... 386/92; 386/98; 386/109
(58) Field of Classification Search .................. 386/46, 386/96, 92, 98, 99, 112, 102, 103, 104, 109
See application file for complete search history.

(56) References Cited

U.S. PATENT DOCUMENTS

| | | | |
|---|---|---|---|
| 4,967,271 A * | 10/1990 | Campbell et al. ............ | 348/452 |
| 5,093,750 A * | 3/1992 | Park et al. ..................... | 386/98 |
| 5,524,060 A * | 6/1996 | Silfvast et al. .............. | 381/104 |
| 5,566,174 A * | 10/1996 | Sato et al. ..................... | 386/96 |
| 5,764,847 A * | 6/1998 | Tanaka ......................... | 386/96 |
| 5,892,884 A * | 4/1999 | Sugiyama et al. ............ | 386/99 |

2001/0002224 A1    5/2001  Sasaki et al.

FOREIGN PATENT DOCUMENTS

| EP | 1030519 | 8/2000 |
|---|---|---|
| WO | 94/16524 | 7/1994 |

OTHER PUBLICATIONS

PCT International Search Report.

* cited by examiner

*Primary Examiner*—Vincent Boccio
(74) *Attorney, Agent, or Firm*—Joseph J. Laks; Robert B. Levy; Jorge Tony Villabon

(57) ABSTRACT

The invention concerns a method (200) and system (100) for recording multiple programs onto a storage medium. The invention includes the steps of: receiving (210) a plurality of multimedia inputs; sampling (212) the multimedia inputs such that the sampled multimedia inputs contain a portion of the plurality of multimedia inputs; combining (214) the sampled multimedia inputs; and encoding (216) the sampled multimedia inputs such that the number of encoding devices required to encode the sampled multimedia inputs is less than the number of the plurality of multimedia inputs. The invention can also include the step of playing back (220) the sampled multimedia inputs. In one arrangement, the playing back step can further include the steps of: decoding (226) at least one of the encoded sampled multimedia inputs to provide a decoded signal; and processing (228) the decoded signal to enable the display of at least one of the multimedia inputs.

18 Claims, 2 Drawing Sheets

RECORDING AND PLAYING BACK MULTIPLE PROGRAMS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

The inventive arrangements relate generally to video recording systems and more particularly to video recording systems that record digitally encoded video sequences onto storage media such as recordable digital video discs, hard drives, magneto optical discs and digital tape.

2. Description of Related Art

Many consumers have recording devices which they use to record their favorite programs. In recent years, however, consumers have been inundated with programming choices. For example, some satellite transmission systems can contain over 500 channels with programming content. As a result, a single recording device severely restricts the consumer's options if the consumer wishes to record several programs.

As a solution, a consumer can purchase more than one recording device and can program each of these devices to record a separate program. Alternatively, several encoders and decoders can be placed in a recording device to accommodate multiple video signals. Notably, however, both of these options increase costs significantly. Moreover, a recorder that employs multiple encoders and decoders may produce a bit rate that exceeds the recorders maximum recording rate and can increase the complexity of the design of the recorder. Although one or more optical drive units can be added to solve the bit rate problem, the issues of added cost and design complexity renders this solution inadequate as well. Thus, what is needed is a recording device capable of recording and playing back multiple video signals without significantly increasing the cost or complexity of the recording device.

SUMMARY OF THE INVENTION

The present invention concerns a method of recording multiple programs onto a storage medium. The method includes the steps of: receiving a plurality of multimedia inputs; sampling the multimedia inputs such that the sampled multimedia inputs contain a portion of the plurality of multimedia inputs; combining the sampled multimedia inputs; and encoding the sampled multimedia inputs such that the number of encoding devices required to encode the sampled multimedia inputs is less than the number of the plurality of multimedia inputs. The method can also include the step of playing back the sampled multimedia inputs. In one arrangement, the playing back step can further include the steps of: decoding at least one of the encoded sampled multimedia inputs to provide a decoded signal; and processing the decoded signal to enable the display of at least one of the multimedia inputs. Additionally, the processing step can further include the step of upconverting at least one of the sampled multimedia inputs.

In another arrangement, the method can further include the step of providing a dummy input to be combined with at least one of the sampled multimedia inputs. Moreover, the plurality of multimedia inputs can contain multimedia data selected from the group comprising video, audio or a combination thereof. Also, each of the plurality of multimedia inputs can contain audio and video.

In another aspect, the multimedia inputs containing video can include a D1 video signal, and the sampling step can further include the step of sampling the D1 video signal to a one-half D1 video signal. In addition, the multimedia inputs containing video can include a D1 video signal, and the sampling step can further include the step of sampling the D1 video signal to an SIF video signal. In another aspect, the multimedia inputs containing audio can include an audio signal with more than two channels of audio, and the sampling step can further include the step of sampling the audio signal to a stereo signal. Moreover, the multimedia inputs containing audio can include an audio signal with more than two channels of audio, and the sampling step can further include the step sampling the audio signal to a mono signal.

The present invention also concerns a system for encoding a plurality of multimedia input signals. The system includes: at least one sampler for sampling the multimedia input signals such that the sampled multimedia input signals contain a portion of the plurality of multimedia input signals; a combiner for combining the sampled multimedia input signals; and at least one encoder for encoding the sampled multimedia input signals, wherein the number of encoders is less than the plurality of multimedia input signals or less than the number of samplers used in sampling the multimedia input signals. In one arrangement, the plurality of multimedia input signals can comprise audio signals, and the system can further include: a receiver for receiving the audio signals; a downmixer for downmixing the audio signals; and at least one encoder for encoding the downmixed audio signals, wherein the number of encoders is less than the number of audio signals. In another arrangement, the plurality of multimedia inputs signals can be video signals and audio signals, and the system can further include a multiplexer for multiplexing the video and the audio signals.

In another aspect, the system can also include: a decoder for decoding at least one of the encoded sampled multimedia inputs to provide a decoded signal; and a processor for processing the decoded signal to enable the display of at least one of the multimedia inputs. In addition, the system can include a demultiplexer for demultiplexing the audio and video signals and a display device for outputting the audio and video signals. Also, the system can include a dummy program generator for providing a dummy input to be combined with at least one of the sampled multimedia inputs.

DETAILED DESCRIPTION OF THE PREFERRED EMBODIMENTS

Figure 1:
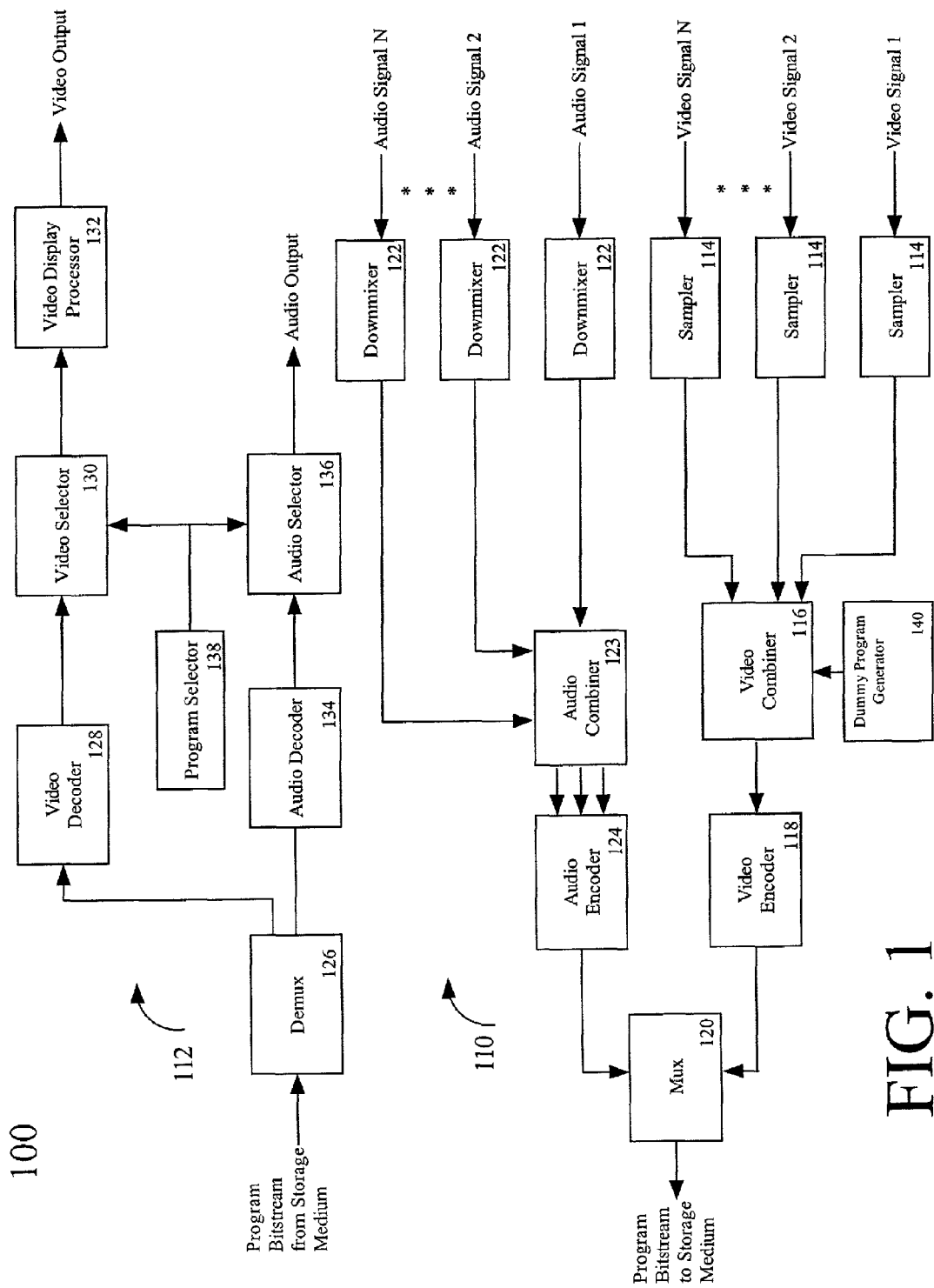
FIG. 1 is a block diagram of a system that can encode multiple multimedia inputs in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other appropriate system capable of encoding and decoding a video signal. The system 100 can include an encoding path 110 for receiving and processing multimedia inputs for purposes of storing the inputs onto a storage medium (not shown). In addition, the system can include a decoding path 112 for receiving and processing multimedia data read from the storage medium. In one arrangement, these multimedia inputs and the multimedia data read from the storage medium can contain video, audio or a combination thereof.

As shown in FIG. 1, the encoding path 110 can include one or more samplers 114 for sampling a corresponding number of video signals. These sampled video signals can then be fed to a video combiner 116, which can combine or merge these sampled video signals. Next, these signals can be encoded by the video encoder 118 and then transferred to a multiplexer 120. The encoding path 110 can also contain one or more samplers in the form of downmixers 122 for sampling or downmixing a corresponding number of audio signals. The downmixed audio signals can then be sent to an audio combiner 123, which can combine the downmixed audio signals. These downmixed audio signals can then be encoded by an audio encoder 124 and transferred to the multiplexer 120, which can multiplex the audio and video signals. These signals can then be sent to a controller (not shown) for purposes of recording the signals onto a storage medium. As will be explained later, the encoding path 110 can also include a dummy program generator 140 for generating one or more dummy programs, which can then be combined with one or more of the incoming sampled video signals.

Referring to the decoding path 112, a demultiplexer 126 can receive and demultiplex the multimedia data read from the storage medium. In one arrangement, if the multimedia data contains video, the video can be decoded by a video decoder 128 and then sent to a video selector 130. The video can then be processed by a video display processor 132 and then forwarded to, for example, a display device (not shown). As will be explained below, the video display processor 132 can be used to upconvert or improve the picture quality of the decoded video signals prior to their display. In one arrangement, the video display processor 132 can be a line doubler; however, the invention is not so limited, as any other known device capable of improving picture quality can be used.

If the multimedia data contains audio, the audio can be decoded by an audio decoder 134 and then transferred to an audio selector 136. Subsequently, the audio can then be sent to the display device as well. In another arrangement, the decoding path 112 can also include a program selector 138 with control interfaces connected to the video selector 130 and the audio selector. The program selector 138 can permit a user to choose between any of the video or audio signals read from the storage medium, as a plurality of these signals may be recorded onto the storage medium during the receiving and encoding steps performed in the encoding path 110. Only those signals selected by the user through the program selector 138 for display are permitted to pass through the video selector 130 and/or the audio selector 136. The steps performed in both the encoding path 110 and the decoding path 112 will be explained in detail below.

Recording and Playing Back Multiple Programs

According to the inventive arrangements, multiple programs can be recorded onto a storage medium. Specifically, a plurality of multimedia inputs can be received, and these inputs can be sampled such that the sampled multimedia inputs contain a portion of the plurality of multimedia inputs. These sampled multimedia inputs can then be combined and encoded such that the number of encoding devices required to encode the sampled multimedia inputs is less than the number of the plurality of multimedia inputs or alternatively, less than the number of sampling devices used to sample the plurality of multimedia inputs. In addition, these sampled multimedia inputs can be played back by decoding at least one of them and processing the decoded signals to enable the display of at least one of the multimedia inputs. Further, during the processing step, one or more of the decoded multimedia inputs to be played back can be upconverted.

Figure 2:
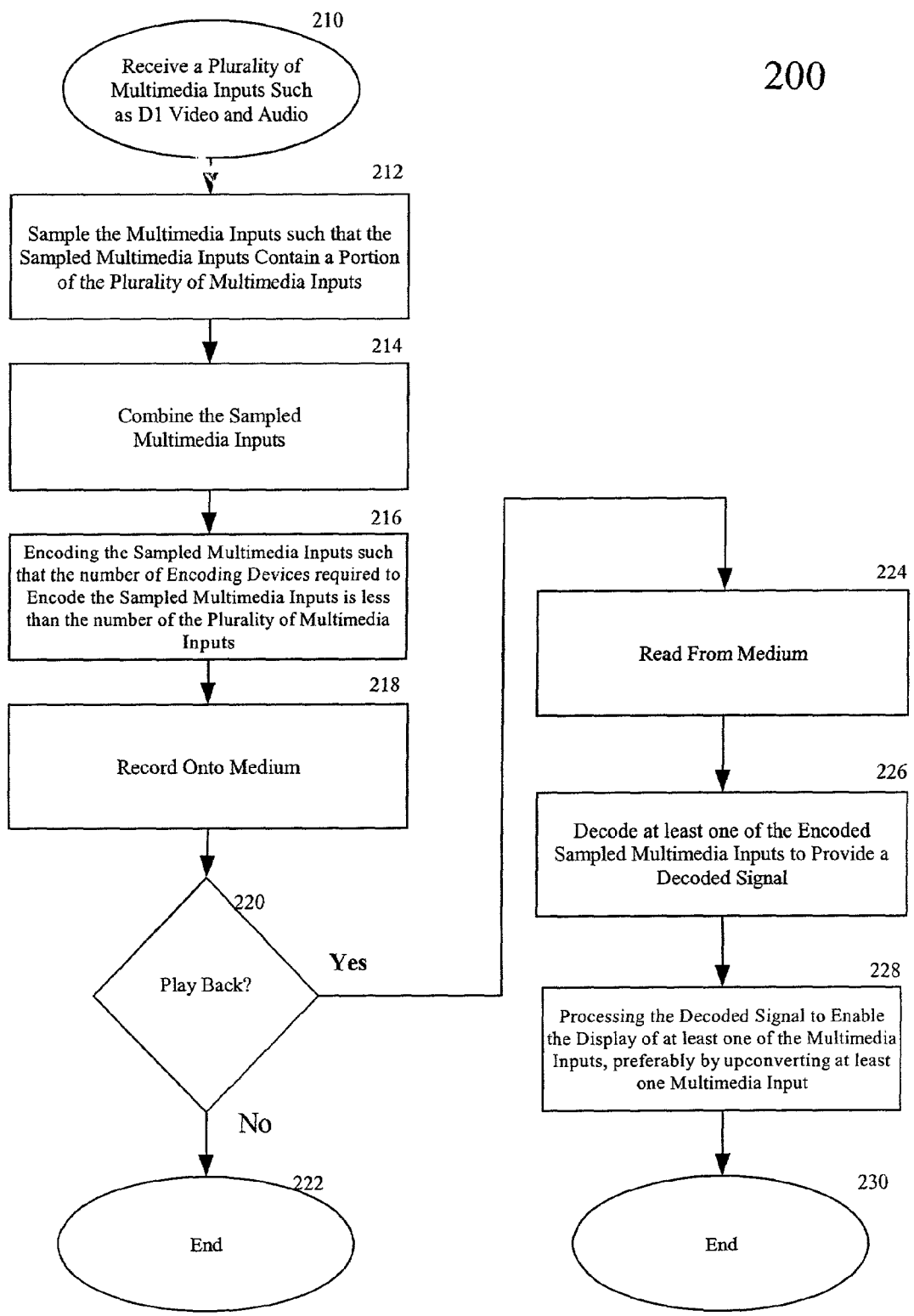
FIG. 2 is a flow chart that illustrates an operation of encoding multimedia inputs and decoding such encoded inputs in accordance with the inventive arrangements.

FIG. 2 illustrates a flowchart 200 that demonstrates one way in which multiple programs can be recorded onto a storage medium using a reduced number or a minimum number of encoding devices. At step 210, a plurality of multimedia inputs can be received. These multimedia inputs can be audio signals, video signals or a combination thereof. Moreover, the invention can receive any number of multimedia inputs.

At step 212, these multimedia inputs can be sampled such that the sampled multimedia inputs contain a portion of the plurality of multimedia inputs. For example, the resolution of the pictures contained in each of the plurality of multimedia inputs that are sampled can be less than the resolution of the pictures contained in each input prior to the sampling process. A number of sampling techniques can be employed to perform this step. As an example, if video is being received, then the resolution of the video signal can be reduced by removing lines of resolution or by removing pixels from the pictures contained in the video signals. If audio is being received, then each audio signal can be sampled or downmixed by removing one or more channels of audio contained in each of the audio signals. It should be noted, however, that the invention is not limited to any particular sampling technique, as any other suitable technique known in the art can be used to sample the incoming multimedia inputs.

The following discussion illustrates an example of the sampling process. Two D1 video signals can be received. The D1 signals are video signals with a picture resolution of 720×480. In some instances, the picture resolution is 704× 480. These signals can be sampled thereby converting them to ½ D1 video signals, i.e., video signals with a picture resolution of 352×480. As a result, each of the sampled ½ D1 signals contains a portion of its original, corresponding D1 video signal. In another example, the D1 signals can be sampled down to ¼ D1 signals or standard input format (SIF) signals with a picture resolution of 352×240. Although the foregoing discussion is helpful because D1, ½ D1 and ¼ D1 video signals are conventional formats, it should be noted that the invention is not limited to such examples. In fact, any number of incoming video signals can be sampled down to any other suitable resolution or picture size.

As another example, two separate audio signals can be received in which each audio signal contains four channels of audio. These incoming audio signals can be sampled or downmixed to audio signals containing only two channels of audio, i.e., each audio signal is now a stereo signal. In another example, the incoming four channel audio signals can be downmixed to audio signals containing only one channel of audio, i.e., each audio signal is now a mono signal. Similar to the examples relating to the incoming video signals, however, the invention is not limited to the foregoing examples, as any number of incoming audio signals can be sampled or downmixed to any other suitable format or size.

Once the multimedia inputs have been suitably sampled, the sampled inputs can be combined, as shown in step 214. For example, if two D1 signals have been received and sampled down to ½ D1 signals, these signals can be combined to create a signal that contains the same number of resolution lines as that typically carried in a full D1 signal. Similarly, if two separate four channel audio signals have been downmixed to two separate stereo signals, then these stereo signals can be combined to create a four channel audio signal.

In one arrangement, a dummy program signal can be generated, which can then be combined with one or more of the incoming sampled video signals to produce a combination of sampled signals in which the combined resolution of the combined signals—including the dummy signal—is equal to that of a D1 signal. A dummy program signal can be a video signal that contains no programming, i.e., a blank picture. As an example, if three D1 signals are received, it may be desired to sample these signals down to ¼ D1 signals, as the ¼ D1 format is a conventional format. Notably, however, if three D1 signals are received and sampled down to ¼ D1, the combined lines of resolution do not equal that of a full D1 signal. Significantly, many video encoders operate more efficiently on video signals with the resolution in a D1 signal. Thus, it may be useful to combine a dummy program signal to the ¼ D1 signals to enable the encoder to operate more efficiently. It should be noted, however, that the invention is not limited to this particular example, as a dummy program signal can be added to any suitable number of sampled video signals for purposes of improving video encoder performance.

Once the multimedia inputs are properly sampled, the inputs can be encoded, as shown in step 216. Notably, as the incoming multimedia inputs have been sampled, the number of encoding devices required to encode these sampled signals is less than the number of the original multimedia inputs. For example, if a conventional storage medium device receives two separate D1 video signals, then the storage medium device requires two separate video encoders to encode the D1 signals simultaneously. Likewise, if two separate four channel audio signals are received, then the storage medium device requires two separate audio encoders to encode the two separate four channel audio signals.

In accordance with the inventive arrangements, however, sampling the incoming multimedia inputs reduces the number of encoders normally required to encode the multimedia inputs. As an example, if two D1 video signals are sampled down to ½ D1 signals and then combined, then only one video encoder is needed to encode both of these signals simultaneously. This reduces the number of encoders required to perform such a process from two to one. Further, if four D1 video signals are sampled down to four ¼ D1 signals and combined, then, again, only one video encoder is needed to encode these ¼ D1 signals.

As another example, if two audio signals each with four channels of audio are downmixed to stereo signals and combined, then only one four channel audio encoder is required to encode the downmixed signals simultaneously. Also, if four audio signals each with four channels of audio are downmixed to mono signals and combined, then only one four channel audio encoder is needed to encode the downmixed audio signals. As a result, the number of encoders required to encode the sampled multimedia inputs is less than the number of encoders typically required to encode the originally received multimedia inputs and is thus less than the number of multimedia inputs actually received. It should be noted, however, that the invention is not limited to the foregoing examples, as any number of multimedia inputs can be received and sampled down to any other suitable format to reduce the number of encoders needed to encode the incoming multimedia inputs.

In one arrangement, once the sampled multimedia inputs have been encoded, the sampled inputs can then be recorded onto a storage medium, as shown at step 218. A determination can then be made as to whether these sampled multimedia inputs can then be played back, as shown at decision block 218. If not, then the process can stop at step 222. If the sampled multimedia inputs are to be played back, then these inputs can be read from the storage medium, as shown at step 224. At step 226, one or more of these multimedia inputs can then be decoded to provide a decoded signal. Specifically, the sampled video signals and the downmixed audio signals can be decoded. These decoded signals can then be processed to enable the display of at least one of the multimedia inputs, as shown at step 228. As an example, since a plurality of these sampled inputs may be read from a storage medium, a user can have the option of selecting which of the inputs he wishes to have displayed. For instance, if four ¼ D1 signals were encoded and recorded onto a storage medium, then the user has the option of viewing any number of the four signals. Those video signals selected for display can then be sent to a display device for viewing while those video signals that are not selected for viewing can be prevented from being displayed. In addition, the user can have the option of choosing which of the audio signals will be played, including the option of combining any of the audio signals with any of the video signals for display.

In one arrangement, the decoded video signals that are to be displayed can be further processed or upconverted to improve their picture quality. As an example, the decoded video signals can be upconverted by passing them through a line doubler or any other known device used for improving picture quality. Finally, flowchart 200 can end at step 230.

Although the present invention has been described in conjunction with the embodiments disclosed herein, it should be understood that the foregoing description is intended to illustrate and not limit the scope of the invention as defined by the claims.

What is claimed is:

1. A method of recording multiple programs onto a storage medium, comprising the steps of:
   receiving a plurality of multimedia inputs, each having at least one respective, different program therein;
   sampling the multimedia inputs such that the sampled multimedia inputs contain a portion of the plurality of multimedia inputs;
   providing at least one dummy input signal to be combined with the sampled multimedia inputs to improve encoding efficiency;
   combining the sampled multimedia inputs and said at least one dummy input signal; and encoding the combined multimedia inputs such that the number of encoding devices required to encode the combined multimedia inputs is less than the number of the plurality of programs.

2. The method according to claim 1, further comprising the step of playing back the sampled multimedia inputs.

3. The method according to claim 2, wherein said playing back step further comprises the steps of:
    decoding at least one of the encoded sampled multimedia inputs to provide a decoded signal; and
    processing the decoded signal to enable the display of at least one of the multimedia inputs.

4. The method according to claim 3, wherein said processing step further comprises the step of upconverting at least one of the sampled multimedia inputs.

5. The method according to claim 1, wherein the plurality of multimedia inputs contain multimedia data selected from the group comprising video, audio or a combination thereof.

6. The method according to claim 1, wherein each of the plurality of multimedia inputs contain audio and video.

7. The method according to claim 5, wherein the multimedia inputs containing video include a D1 video signal and said sampling step further comprises the step of sampling the D1 video signal to a one-half D1 video signal.

8. The method according to claim 5, wherein the multimedia inputs containing video include a D1 video signal and said sampling step further comprises the step of sampling the D1 video signal to an SIF video signal.

9. The method according to claim 5, wherein the multimedia inputs containing audio include an audio signal with more than two channels of audio and said sampling step further comprises the step sampling the audio signal to a stereo signal.

10. The method according to claim 5, wherein the multimedia inputs containing audio include an audio signal with more than two channels of audio and said sampling step further comprises the step sampling the audio signal to a mono signal.

11. A system for encoding a plurality of multimedia input signals having multiple programs, comprising:
    at least one sampler for sampling the multimedia input signals such that the sampled multimedia input signals contain a portion of the plurality of multimedia input signals, each of said multimedia input signals having at least one respective, different program therein;
    a dummy signal generator for providing at least one dummy input signal to be combined with at least one of the sampled multimedia inputs to improve encoding efficiency;
    a combiner for combining the sampled multimedia input signals and said at least one dummy input signal; and
    at least one encoder for encoding the combined multimedia input signals, wherein the number of encoders is less than the plurality of programs.

12. The system according to claim 11, wherein the plurality of multimedia input signals comprise audio signals and the system comprises:
    a receiver for receiving the audio signals;
    a downmixer for downmixing the audio signals; and
    at least one encoder for encoding the downmixed audio signals, wherein the number of encoders is less than the number of audio signals.

13. The system according to claim 12, wherein the plurality of multimedia inputs signals are video signals and audio signals and the system further comprises a multiplexer for multiplexing the video and the audio signals.

14. The system according to claim 13, further comprising:
    a decoder for decoding at least one of the encoded sampled multimedia inputs to provide a decoded signal; and
    a processor for processing the decoded signal to enable the display of at least one of the multimedia inputs.

15. The system according to claim 14, further comprising a demultiplexer for demultiplexing the audio and video signals.

16. The system according to claim 15, further comprising a display device for outputting the audio and video signals.

17. The system according to claim 11, wherein the number of encoders is less than the number of samplers used for sampling the multimedia input signals.

18. A system for encoding a plurality of multimedia input signals, wherein the multimedia input signals contain video signals and audio signals comprising:
    a receiver for receiving the plurality of multimedia input signals, each having at least one respective, different program therein;
    at least one sampler for sampling the multimedia input signals such that the sampled multimedia input signals contain a portion of the plurality of multimedia input signals;
    a combiner for combining the sampled multimedia input signals;
    at least one encoder for encoding the sampled multimedia input signals, wherein the number of encoders is less than the plurality of programs;
    a multiplexer for multiplexing the video and the audio signals;
    a decoder for decoding at least one of the encoded combined multimedia inputs to provide at least one decoded signal;
    a processor for processing the decoded signal to enable the display of at least one of the multimedia inputs;
    a demultiplexer for demultiplexing the audio and video signals;
    a display device for outputting the audio and video signals; and
    a dummy program generator for providing a dummy input to be combined with at least one of the sampled multimedia inputs.

* * * * *